(12) United States Patent
Cai et al.

(10) Patent No.: US 7,810,699 B1
(45) Date of Patent: Oct. 12, 2010

(54) METHOD AND SYSTEM FOR OPTIMIZED VIBRATION WELDING

(75) Inventors: Wayne W. Cai, Troy, MI (US);
Alexander D. Khakhalev, Troy, MI (US); Roland J. Menassa, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/427,912

(22) Filed: Apr. 22, 2009

(51) Int. Cl.
  *B23K 1/06* (2006.01)
  *B23K 20/12* (2006.01)
(52) U.S. Cl. .................. 228/102; 228/1.1; 228/2.1; 228/8; 228/110.1; 228/112.1
(58) Field of Classification Search .......... None
See application file for complete search history.

(56) References Cited

U.S. PATENT DOCUMENTS

| | | | |
|---|---|---|---|
| 5,603,444 A * | 2/1997 | Sato | 228/1.1 |
| 5,795,419 A * | 8/1998 | Lotz et al. | 156/64 |
| 7,674,729 B2 * | 3/2010 | Davison | 438/800 |
| 2002/0096554 A1 * | 7/2002 | Jiang et al. | 228/180.5 |
| 2003/0019561 A1 * | 1/2003 | Tominaga et al. | 156/73.1 |
| 2003/0111512 A1 * | 6/2003 | O'Connell et al. | 228/110.1 |
| 2003/0218050 A1 * | 11/2003 | Kanemoto et al. | 228/103 |
| 2004/0004106 A1 * | 1/2004 | Franklin et al. | 228/1.1 |
| 2004/0216829 A1 * | 11/2004 | Gordon, Jr. | 156/64 |
| 2006/0000870 A1 * | 1/2006 | Matsumura | 228/1.1 |
| 2006/0011706 A1 * | 1/2006 | Kurita et al. | 228/110.1 |
| 2006/0144902 A1 * | 7/2006 | Pochardt et al. | 228/101 |
| 2007/0152021 A1 * | 7/2007 | Hesse et al. | 228/101 |
| 2007/0158012 A1 * | 7/2007 | Heil et al. | 156/73.1 |
| 2007/0199641 A1 * | 8/2007 | Gordon, Jr. | 156/64 |
| 2007/0257086 A1 * | 11/2007 | Schroeder | 228/101 |
| 2007/0257087 A1 * | 11/2007 | Klinstein et al. | 228/101 |
| 2008/0308611 A1 * | 12/2008 | Alessi et al. | 228/112.1 |
| 2009/0013786 A1 * | 1/2009 | Gassert | 73/579 |
| 2009/0233025 A1 * | 9/2009 | Cvancara et al. | 428/35.7 |
| 2009/0314412 A1 * | 12/2009 | Gabler et al. | 156/64 |
| 2010/0006235 A1 * | 1/2010 | Patrikios et al. | 156/580.1 |

FOREIGN PATENT DOCUMENTS

DE   4206584 A * 9/1993
JP   05074876 A * 3/1993

\* cited by examiner

*Primary Examiner*—Kiley Stoner
(74) *Attorney, Agent, or Firm*—Quinn Law Group, PLLC

(57) ABSTRACT

A method of minimizing mechanical resonance in an assembly during formation of a vibration-welded joint therein includes positioning work pieces such that they are directly adjacent to each other, and generating a set of control signals that cause one or more sonotrode weld heads to vibrate. A waveform characteristic of a mechanical oscillation of the sonotrode(s) and weld head(s) is varied to minimize the mechanical resonance occurring in the assembly, such as a multi-cell battery for a vehicle. An apparatus for forming the welded joint includes at least one sonotrode having a weld head or heads formed integrally therewith, and a weld controller. The controller is connected to a converter, sonotrode(s), and weld head(s), with the mechanical oscillation occurring in the sonotrode(s) and weld head(s). Variation of the control signals during formation of the welded joint varies a waveform characteristic of the mechanical oscillation, thus minimizing the mechanical resonance.

20 Claims, 4 Drawing Sheets

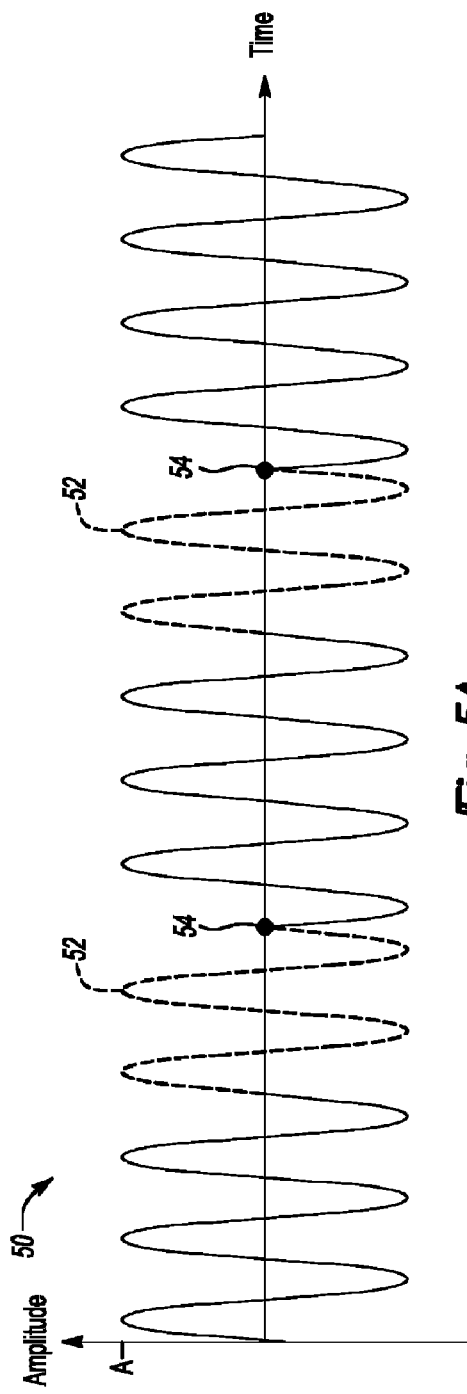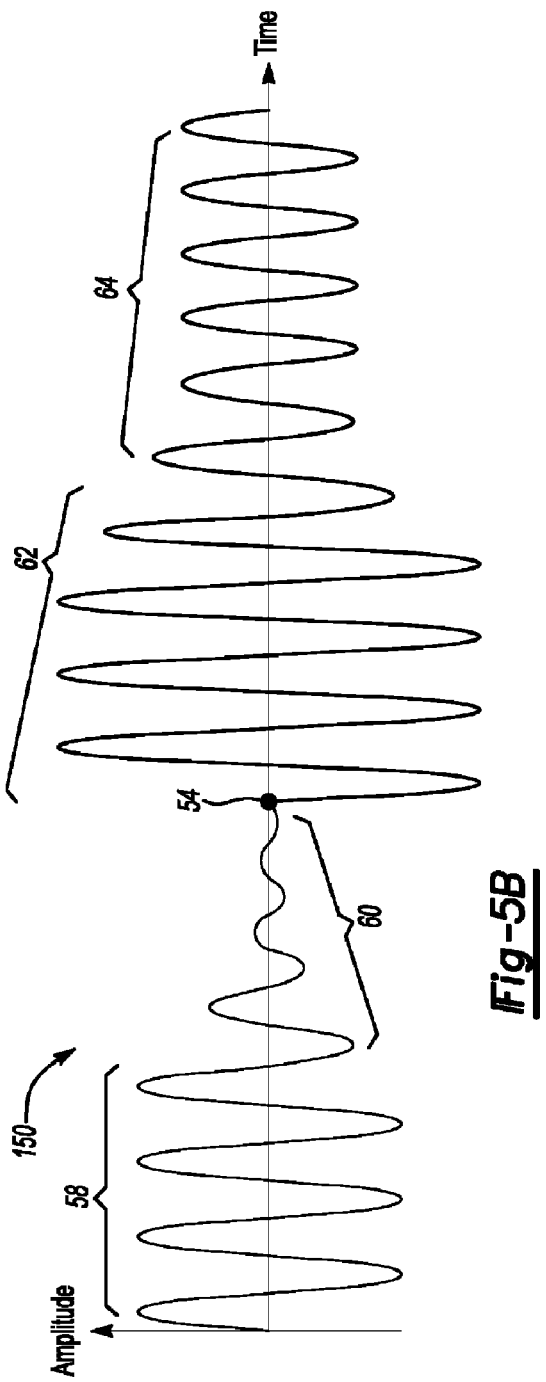

METHOD AND SYSTEM FOR OPTIMIZED VIBRATION WELDING

TECHNICAL FIELD

The invention relates generally to the process of vibration welding, and in particular to a method and a system for producing a vibration-welded joint having an optimal weld quality.

BACKGROUND OF THE INVENTION

The process of vibration welding utilizes oscillations or vibrations in a particular range of frequencies to bond adjacent plastic or metallic work pieces. Vibration welding can involve moving a work piece under pressure while transmitting oscillations or vibrations therethrough, thus creating heat via surface friction that ultimately bonds or fuses the work piece. A welding tool, referred to alternately as a weld horn or a sonotrode, is directly connected to, or formed integrally with, a weld head. The weld head can include one or more weld buttons. Both plastic and metallic vibration welding processes have tremendous utility in industry, for example in the fusing or bonding of onboard components during the manufacturing of a vehicle.

An exemplary vehicular device that can be manufactured using conventional vibration welding techniques is a multi-cell battery module or battery pack. Such a device can be used as an energy storage system for a variety of applications, including but not limited to the powering of various onboard electronic devices and/or for vehicular propulsion in a hybrid electric vehicle (HEV), an electric vehicle (EV), a plug-in hybrid electric vehicle (PHEV), and the like. While conventional battery designs such as alkaline, voltaic pile, and lead-acid batteries have been used in countless household and industrial applications over the past century, evolving battery types such as nickel cadmium (NiCd), nickel-metal hydride (Ni-MH), lithium ion, and lithium ion polymer batteries have displayed particular utility in emerging vehicle propulsion applications, due in large part to their superior energy densities. Such batteries are often selectively rechargeable either as plug-in style batteries or onboard during a regenerative braking event, depending on the particular configuration of the vehicle.

The long term efficiency, reliability, and durability of a multi-cell battery depends largely on the strength of the welded connections or welded joints between the various cells, and between the various components forming the multi-cell battery. As noted above, conventional vibration welding techniques can be used to form the required welded joints in such a battery, as well as in various other vehicular and non-vehicular components. However, such methods may be limited in certain respects due in part to factors such as mechanical resonance.

SUMMARY OF THE INVENTION

Accordingly, a vibration welding process or method is provided herein which specifically incorporates a predetermined variation into a mechanical oscillation or vibration that is transmitted or conducted to the weld head or heads of one or more sonotrodes. The variation helps to minimize or otherwise change a level or amount of mechanical resonance in the component or assembly being welded. For example, a single weld head can be used to form a welded joint while the amplitude and/or a frequency and wavelength of oscillation is varied, and/or while a phase shift is introduced to the waveform of the mechanical oscillation. Or, multiple weld heads can be used to form the welded joint, with their vibrations synchronized in substantially equal and opposite directions to thereby balance their respective forces and moments. Even without such synchronization, the amplitude and/or a frequency and wavelength of mechanical oscillation can be varied as noted above. In any of these examples the mechanical resonance is minimized in the assembly during vibration welding.

The method can be used in a host of vibration welding processes, wherein surfaces of one or more work pieces are joined or welded together using an applied pressure and mechanical vibration or oscillation, including but not limited to ultrasonic welding. An exemplary vibration-welded product or assembly is a multi-cell battery module or battery pack suitable for use as a propulsive power source aboard an HEV, PHEV, PEV, or other vehicle, although those of ordinary skill in the art will recognize that the range and type of products that stand to benefit from the present invention are not so limited.

Mechanical resonance can be substantially minimized relative to conventional vibration welding methods by modifying a waveform characteristic of the mechanical oscillation of a weld head(s) used for forming the welded joints. The control signals generated by a weld controller, which can be integral with or a device separate from a welding power supply, are initially electrical in nature. A converter in turn converts the signals from the controller into the mechanical oscillation, i.e., the actions/movements of one or more weld heads of a sonotrode, or of multiple sonotrodes. The controller can be used to vary the waveform characteristics of the mechanical oscillation, either directionally with respect to a plane of the work pieces and/or by changing one or more of the frequency, amplitude, and/or wavelength of the oscillation as noted above, including the introduction of a phase shift in an exemplary embodiment.

For example, using a plurality of weld heads each with a connected or integrally formed horn pads or weld buttons, the weld heads can be caused to vibrate at a predetermined uniform frequency and amplitude, while at the same time the direction of the oscillation is alternated, e.g., in a circular and/or back-and-forth/up-and-down direction relative to a plane of the work pieces. Control of an equal number of weld heads can be synchronized in an exemplary embodiment to optimally balance the resonant forces generated during vibration welding. The weld heads can be positioned side-by-side or, for added compactness, can be nested one within the other without departing from the intended scope of the invention.

As mechanical resonance in the welded parts does not occur instantaneously with the introduction of vibration to the weld head, but rather builds over time to a tolerable threshold, further variation of the control signals can be provided via a phase shift introduced into the waveform of the mechanical oscillation. The phase shift can be introduced prior to the point in time at which mechanical resonance is expected to build above the tolerable threshold, thus helping to preempt or defeat the onset of mechanical resonance in the assembly that is being welded. The mechanical oscillation can be periodically interrupted and restarted to the same or a similar resonance-defeating effect. Likewise, one could vary the amplitudes, and/or the frequency/wavelength of the oscillation, and/or periodically attenuate the waveform of the mechanical oscillation, terminating the attenuated waveform in a phase shift that is immediately followed by increased amplitude, or any combination of these waveform effects.

In particular, a method of forming a vibration-welded joint in a component or assembly is provided that includes transmitting control signals from a weld controller to a converter that is mechanically connected to at least one weld head. A predetermined mechanical vibration or an oscillation occurs in the weld heads, which helps form the vibration-welded joint when used in conjunction with an applied force as noted above. The method includes varying the control signals to modify a characteristic(s) of the mechanical oscillation during formation of the vibration-welded joint, thereby minimizing or changing the mechanical resonance in the welded joint and the welded assembly.

An apparatus for forming a vibration-welded joint between work pieces in an assembly is also provided that includes one or more weld heads that ultimately vibrate or oscillate in response to a set of control signals. A stationary device or anvil can support a work piece while another work piece is positioned thereon. Characteristics of the mechanical oscillation can be varied during formation of the vibration-welded joint to minimize or prevent mechanical resonance in the assembly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5A is an exemplary mechanical oscillatory waveform for use with a weld head of the system of FIG. 1;

FIG. 5B is an alternate embodiment of the mechanical oscillatory waveform of FIG. 5A.

DESCRIPTION OF THE PREFERRED EMBODIMENTS

Figure 1:
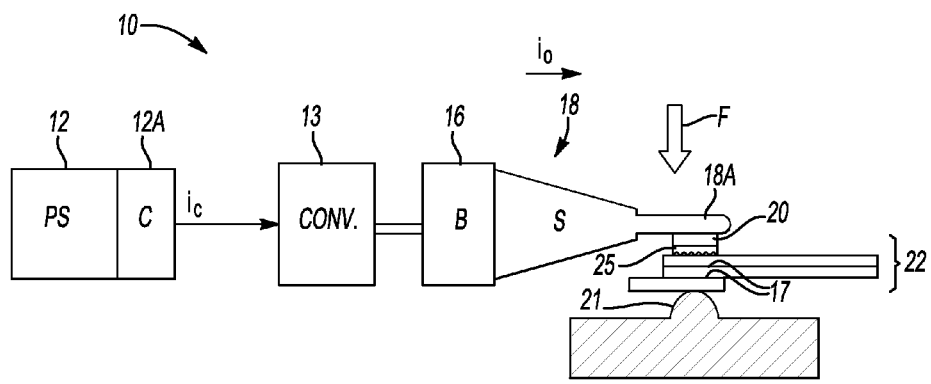
FIG. 1 is a schematic side view illustration of a vibration welding system usable in accordance with the invention.

Referring to the drawings, wherein like reference numbers refer to like components, and beginning with FIG. 1, a vibration welding apparatus or system 10 adapted to minimize or change the mechanical resonance occurring in an assembly that is being vibration-welded using the system 10. The system 10 includes a welding power supply (PS) 12 operable for transforming source power into a form useable for vibration welding. As will be understood by those of ordinary skill in the art, a power supply used for vibration welding, such as the power supply 12 of FIG. 1, can be electrically connected to any suitable energy source, e.g., a 50-60 Hz wall socket.

The power supply 12 can include a weld controller (C) 12A, usually but not necessarily integrally included within the power supply 12. The power supply 12 is operable for transforming the source power into an output signal, i.e., an electrical control signal (arrow $i_C$), having a predetermined waveform characteristic(s) well suited for use in vibration welding, for example several Hertz (Hz) to approximately 40 KHz, or much higher frequencies depending on the particular application.

The electrical control signal (arrow $i_C$) is transmitted from the power supply 12, or more precisely from the weld controller 12A, to a converter (CONV) 13 having the required mechanical structure for producing a mechanical vibration or oscillation (arrow $i_O$) of a welding head 18A that is integrally formed with a welding horn or sonotrode (S) 18, with the mechanical oscillation (arrow $i_O$) generated in response to the control signal (arrow $i_C$). Within the scope of the invention, the mechanical oscillation (arrow $i_O$) is described by the various waveform characteristics thereof in terms of both the direction of oscillation and the amplitude and frequency/wavelength. The mechanical oscillation (arrow $i_O$) can define or describe a generally periodic waveform such as a sine wave, a square wave, a triangular wave, etc.

The system 10 can also include a booster (B) 16 adapted for amplifying the amplitude of vibration, and/or for changing the direction of a force (arrow F) as described below. That is, the mechanical oscillation (arrow $i_O$) can initially have a relatively low amplitude, e.g., a fraction of a micron up to a few millimeters, which can then be amplified via the booster 16 to produce the mechanical oscillation (arrow $i_O$). The mechanical oscillation (arrow $i_O$) is in turn transmitted to the weld head 18A, with the sonotrode 18 and weld head 18A directly coupled or connected to the booster 16.

The weld head 18A that is operatively connected to or formed integrally with the sonotrode 18 is the actual vibrating or oscillating device used in the system 10 to form a vibration-welded joint in conjunction with an applied force (arrow F), shown as an exemplary vertical force in FIG. 1. The applied force (arrow F) can be a force applied by an external mechanism (not shown), and/or can be applied by the booster 16. A welded joint is formed in proximity to an interface 17 between each of the work pieces 22, or between adjoining or weldable surfaces of a single workpiece.

Each weld head 18A is directly attached to or formed integrally with one or more welding buttons 20 contacting the actual surfaces contacting the work pieces 22 during formation of the vibration-welded joint at or along the interface 17. The work surfaces 25 of the welding buttons 20 can include knurls or teeth to provide a sufficient grip on the work pieces 22. To facilitate the vibration welding process, one or more of the work pieces 22 can be positioned on a stationary surface or an anvil 21.

Figure 2:
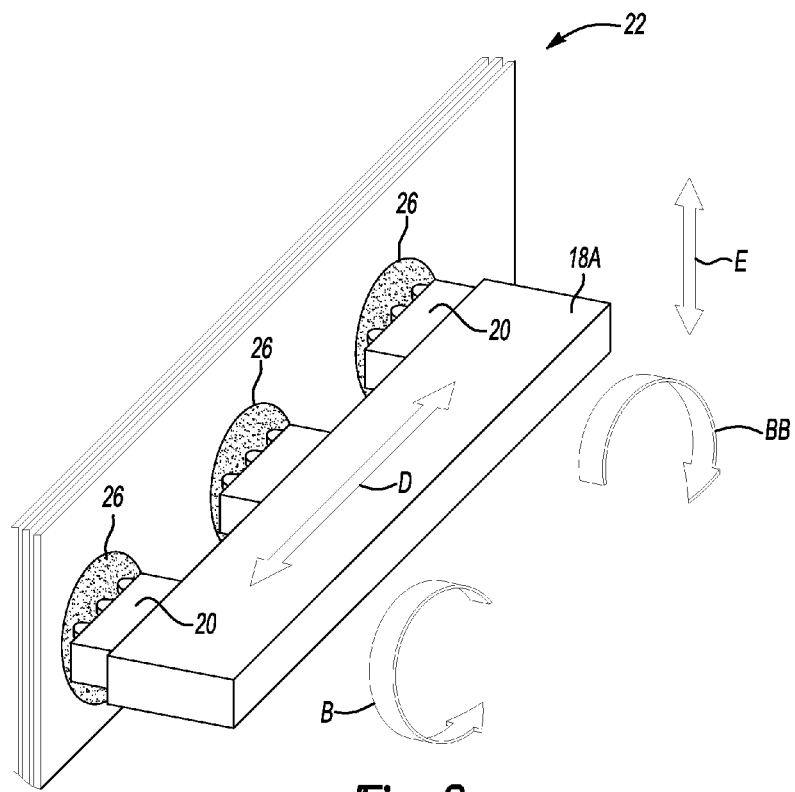
FIG. 2 is a schematic perspective illustration of an exemplary weld head having a plurality of weld buttons.

Referring to FIG. 2, an exemplary set of work pieces 22 can be bonded, fused, or joined using vibration welding. In the exemplary embodiment of FIG. 2, a single weld head 18A of a sonotrode 18 (see FIG. 1) can be caused to oscillate or vibrate, while a waveform characteristic in the form of amplitude and/or frequency and wavelength can be varied by the weld controller 12A to minimize mechanical resonance in any component being welded. That is, the waveform characteristic variations explained below with reference to FIGS. 5A-C can be used to minimize mechanical resonance in a welded assembly. The work pieces 22 can be a set of adjacent surfaces such as sheet metal of the type used in fabricating vehicle doors and panel assemblies, or any other set of metallic or plastic surfaces suitable for bonding via the vibration welding, whether vehicular or otherwise. The weld head 18A is provided with a plurality of buttons 20 as noted above. While a single weld head 18A is shown having three buttons 20, the number of buttons 20 can vary without departing from the intended scope of the invention in this particular embodiment.

As will be understood by those of ordinary skill in the art, the weld head 18A can be caused to oscillate or vibrate in a predetermined linear direction relative to a plane of the work pieces 22, as indicated by the respective horizontal and vertical arrows D and E. Likewise, the direction of vibration of the weld head 18A can be caused to occur in the clockwise or counterclockwise directions, e.g., a partial or full degree of motion in either rotational direction, as respectively indicated by arrows BB and B. The weld head 18A of FIG. 2 can be controlled as set forth below in order to form the welded joints 26 in an optimal manner.

Figure 3:
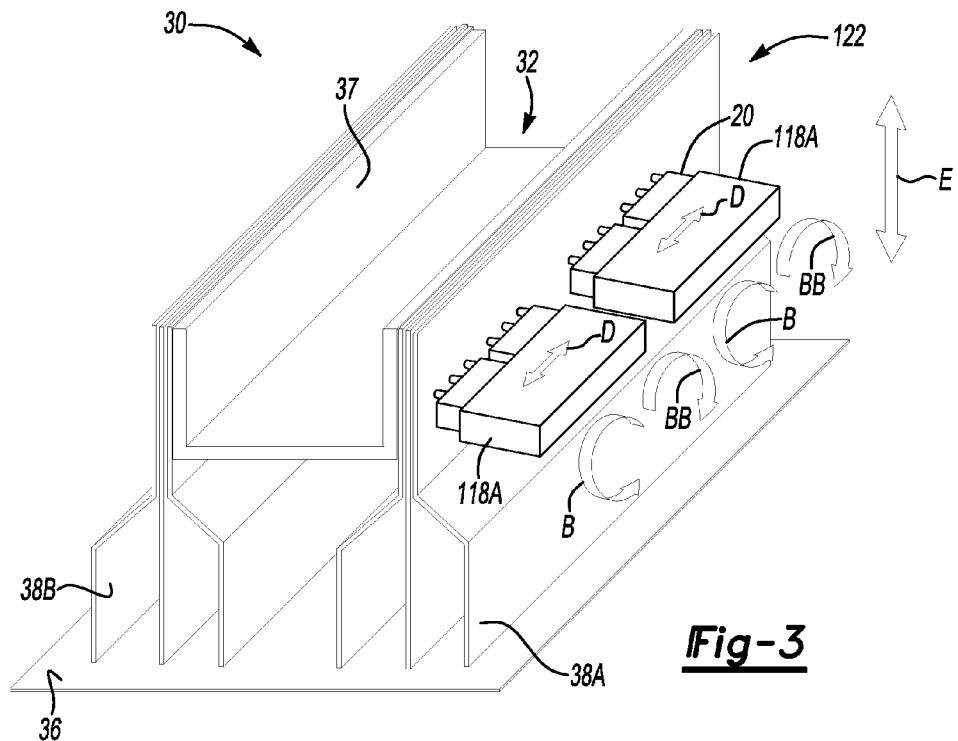
FIG. 3 is a schematic perspective illustration of a set of weld heads used for welding a multi-cell battery unit according to another exemplary embodiment.
Figure 4:
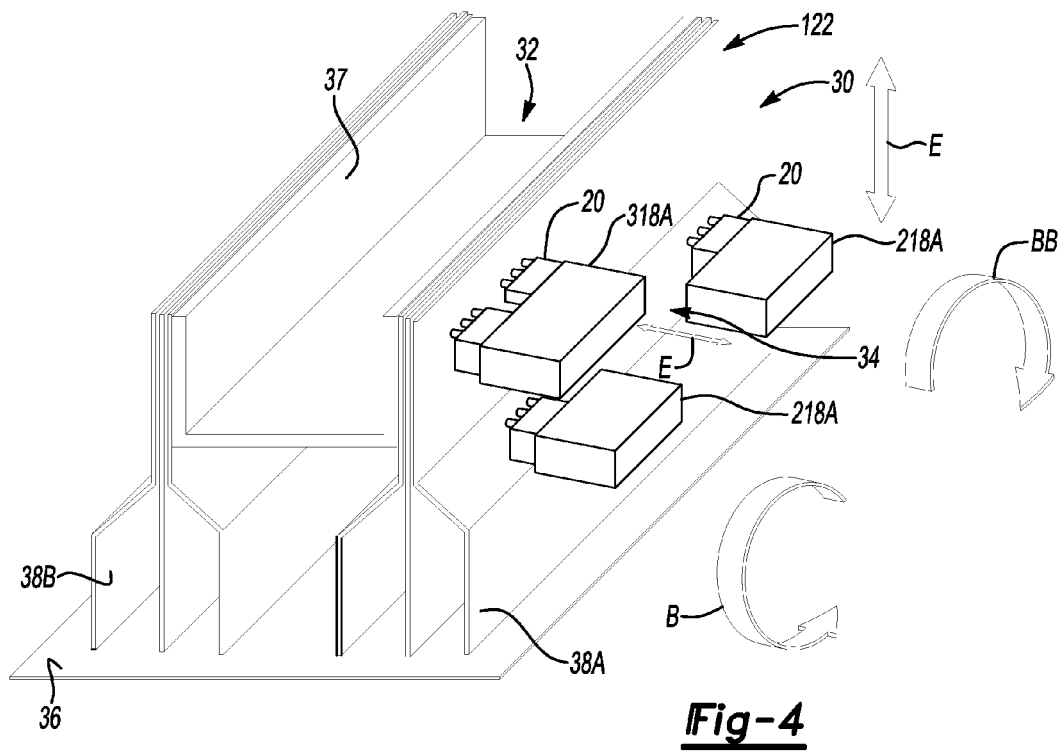
FIG. 4 is a schematic perspective illustration of another exemplary set of weld heads.

Referring to FIGS. 3 and 4, the work pieces 22 of FIGS. 1 and 2 can also be embodied as work pieces 122 having a set of tabs 38A, 38B of a multi-cell battery unit 30 as generally described above. By way of example, the battery unit 30 could be sufficiently sized to provide the necessary voltage for powering an electric vehicle or a hybrid gasoline/electric vehicle, e.g., approximately 300 to 400 volts or another voltage range, depending on the required application. An elongated interconnecting member 32 can be constructed of a suitable conductive material. The interconnecting member 32 can be shaped, sized, and/or otherwise configured to form an elongated rail or bus bar, and can be mounted to an interconnect board (not shown) of the battery unit 30. For simplicity, only the portions of the battery unit 30 extending above an imaginary plane 36 are shown in FIGS. 3 and 4.

The battery unit 30 can include a plurality of battery cells (not shown) embodied as any of a number of different designs, e.g., lithium ion, lithium ion polymer, nickel metal hydride, nickel cadmium, etc., depending upon the intended application. Each cell of the battery unit 30 includes a positively-charged terminal or tab 38A, and a negatively-charged terminal or tab 38B. The particular tabs 38A, 38B that are positively and negatively-charged can be reversed from the configuration shown in FIGS. 3 and 4 without departing from the intended scope of the invention, i.e., with tabs 38A being negatively-charged and tabs 38B being positively-charged. Whatever their respective charges, the tabs 38A, 38B are electrode extensions of a cell (not shown) that are each internally welded to the various anodes and cathodes comprising that cell, as will be understood by those of ordinary skill in the art.

As shown in FIGS. 3 and 4, the positively-charged tabs 38A can be placed immediately adjacent to each other, as well as to a side wall 37 of the interconnecting member 32 or another interconnecting member having a different but suitable configuration. The tabs 38A are then vibration welded, fused, or otherwise joined together and with the interconnecting member 32 to form one or more welded joints 26 (see FIG. 2). Likewise, the negatively-charged tabs 38B can be placed immediately adjacent to each other, as well as to the interconnecting member 32 or another suitable interconnecting member. The tabs 38B are then vibration-welded together and with interconnecting member 32 to form another welded joint 26 (see FIG. 2), which is not visible from the perspective of FIGS. 3 and 4, but which is substantially identical to the welded joints 26 in proximity to the tabs 38A.

In the exemplary embodiment shown in FIG. 3, an even number of weld heads 118A can each include an equal number of buttons 20 to substantially balance a force and moment imparted during formation of the vibration-welded joint. Direction of motion of the vibration of the weld heads 118A can be synchronized, i.e., applied in substantially equal and opposite directions, in order to provide the required variation in the mechanical oscillation (arrow $i_O$ of FIG. 1). Although a pair of weld heads 118A are shown in FIG. 3, any even number of weld heads 118A of different independently or interdependently controllable sonotrodes can be used in accordance with this particular embodiment, with the forces generated by each weld head 118A substantially canceled or balanced by a corresponding weld head 118A. The direction of vibration of each weld head 118A can be independently or interdependently controlled as noted above in a linear back-and-forth direction, as indicated by the arrows D and E, as well as in a rotational or circular direction as indicated by arrows B and BB.

In the exemplary embodiment of FIG. 4, for added compactness a weld head 318A can be positioned or nested within or inboard of a set of weld heads 218A as shown. The vibration of the weld heads 218A, 318A can be independently or interdependently controlled and varied as needed. The weld heads 218A can be connected together to form a unitary structure as shown in phantom to define a channel 34 into which the weld heads 318A can fit, as indicated generally by arrow E.

Referring to FIG. 5A, and with reference to the structure of FIGS. 1-4, the mechanical oscillation (arrow $i_O$ of FIG. 1) transmitted to the weld heads 18A, 118A, 218A, and 318A described above with reference to FIGS. 1-4 can produce a periodic waveform, exemplified hereinafter as a sinusoidal waveform or sine wave 50 having a frequency, amplitude, and wavelength as shown. However, any other square, triangular, or other periodic waveforms can also be used without departing from the intended scope of the invention. The amplitude (A) represents the amount of displacement of the buttons 20 relative the plane of the work pieces 22. For example, the amplitude transmitted by the booster 16 of FIG. 1 can be set at approximately 20 micron or any other desired level, and held constant in the embodiment of FIG. 5A.

Variation in the mechanical oscillation (arrow $i_O$) can then be achieved at least in part by introducing a phase shift into the sine wave 50 at points 54, and/or as shown in phantom at 52, by temporarily interrupting or ceasing transmission of the sine wave 50 for a calibrated period, and then resuming with the phase shift at points 54. The embodiment of FIG. 5A is shown having a fixed peak amplitude (A), however as shown in FIG. 5B the amplitude (A) can also be varied to further change or minimize the mechanical resonance in the work pieces 22.

Referring to FIG. 5B, another sine wave 150 has a varied amplitude. The sine wave 150 can include a period 58 having a fixed amplitude and wavelength, followed by an attenuated portion 60, which can terminate at a point 54 in a phase shift as described above with reference to FIG. 5A. Point 54 can be followed by a period 62 having increased amplitude relative to that of periods 58 and 60, followed by a period 64 of a once again stable amplitude and wavelength. The order of periods 58, 60, 62, and 64 can vary without departing from the intended scope of the invention, and it is not necessary to include each period 58, 60, 62, 64 in order to produce a desired amount of variation, provided sufficient variation in the mechanical oscillation (arrow $i_O$) is achieved in the sine wave 150.

Figure 5C:
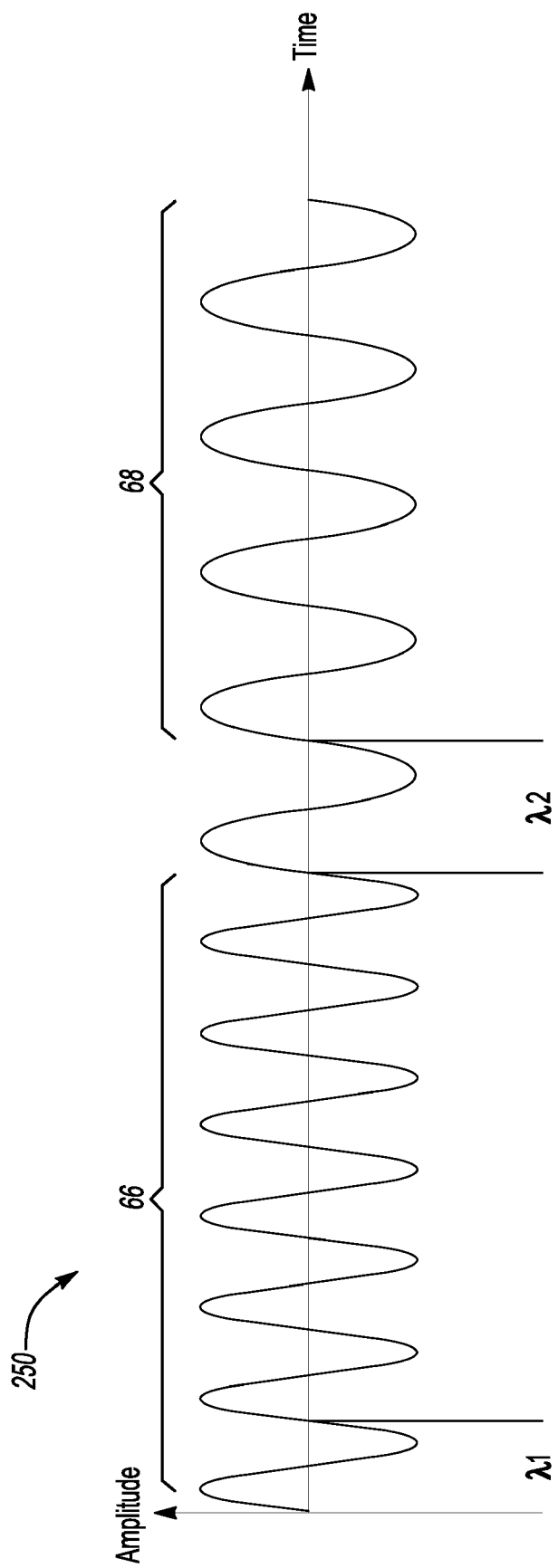
FIG. 5C is another alternate embodiment of the mechanical oscillatory waveform of FIGS. 5A and 5B.

Referring to FIG. 5C, another sine wave 250 can include a stable or uniform amplitude, but with a varied wavelength. For example, the sine wave 250 can be transmitted with a fixed amplitude (A) and a first wavelength $\lambda 1$ over a first period 66, followed by a period 68 over which the same amplitude (A) is maintained, but with a second wavelength ($\lambda 2$) that is different from the first wavelength ($\lambda 1$). While the first wavelength ($\lambda 1$) is shown as being shorter than second wavelength $\lambda 2$ in FIG. 5C, the second wavelengths ($\lambda 2$) can be shorter than the first wavelength ($\lambda 1$), or the wavelengths ($\lambda 1$, $\lambda 2$) can be varied over time, in order to produce the desired variation for defeating mechanical resonance. Likewise, the sine wave 250 can be modified using any of the variations set forth above with reference to FIGS. 5A and 5B, i.e., phase shifting, amplitude variation, signal or waveform attenuation and/or interruption, etc.

Using the method and apparatus as set forth above, mechanical resonance caused by ultrasonic welding and other vibration welding processes can be minimized to provide a vibration-welded joint having optimal qualities, particularly with respect to weld efficiency and strength, and the long-term durability of the system. Control signals that are ultimately input as a vibration to a weld head or multiple weld heads can be varied, while independent or inter-dependently controllable weld heads can be used to offset or balance resonant forces occurring in the work pieces. Different waveforms and/or welding schedules can also be used for the different weld heads to further optimize weld quality such as by minimizing instances of de-bonding or weakening between work pieces, such as between the adjacent tabs of the battery tabs in a multi-cell vehicle battery or any other vibration-welded structure.

While the best modes for carrying out the invention have been described in detail, those familiar with the art to which this invention relates will recognize various alternative designs and embodiments for practicing the invention within the scope of the appended claims.

The invention claimed is:

1. A method of minimizing mechanical resonance in an assembly during formation of a vibration-welded joint therein, the method comprising:
    generating a set of control signals using a weld controller;
    converting the control signals into a substantially periodic mechanical oscillation having a predetermined variation using a converter, the mechanical oscillation having a plurality of waveform characteristics including a direction, an amplitude, a frequency, and a wavelength; and
    transmitting the mechanical oscillation with the predetermined variation from the converter to at least one weld head such that the mechanical oscillation with the predetermined variation always occurs in the weld head during formation of the vibration-welded joint;
    wherein the predetermined variation is adapted to minimize the mechanical resonance in the assembly, is provided in at least one of the plurality of waveform characteristics, and is transmitted to the at least one weld head during formation of the vibration-weld joint; and
    wherein the mechanical oscillation is used in conjunction with an applied pressure to thereby form the vibration-welded joint.

2. The method of claim 1, wherein the predetermined variation includes a variation in the direction of the mechanical oscillation relative to a plane of the work pieces.

3. The method of claim 1, wherein the mechanical oscillation is a substantially periodic wave, and wherein the predetermined variation is a variation in at least one of the amplitude, the frequency, and the wavelength of the periodic wave.

4. The method of claim 3, wherein the predetermined variation includes at least one of: a predetermined phase shift into the periodic wave, attenuating the periodic wave in a predetermined manner, and interrupting the periodic wave in a predetermined manner.

5. The method of claim 1, wherein transmitting the mechanical oscillation includes: simultaneously transmitting a first mechanical oscillation to a first weld head and a second mechanical oscillation to a second weld head positioned adjacent to the first weld head.

6. The method of claim 5, wherein the first and the second weld heads are controllable in one of an independent and an interdependent manner to thereby substantially balance or cancel resonant forces generated by each of the first and the second weld heads.

7. The method of claim 1, including a first, a second, and a third weld head, the method further comprising: nesting the first weld head in a channel defined by the second and the third weld head.

8. A method of minimizing mechanical resonance in a multi-cell battery unit during formation of a vibration-welded joint in the battery unit, the method comprising:
    positioning multiple conductive tabs of the battery unit adjacent to each other;
    generating a set of control signals using a weld controller;
    converting the control signals into a substantially periodic mechanical oscillation having a predetermined variation using a converter, the mechanical oscillation having a plurality of waveform characteristics including a direction, an amplitude, a frequency, and a wavelength, at least one of which includes the predetermined variation; and
    transmitting the mechanical oscillation with the predetermined variation to a sonotrode having at least one weld head, thereby producing a predetermined oscillation in the sonotrode and in the weld head;
    wherein the predetermined variation is adapted to minimize the mechanical resonance in the assembly, and is transmitted to the at least one weld head during formation of the vibration-weld joint.

9. The method of claim 8, including a first, a second, and a third weld head, the method further comprising: nesting the first weld head in a channel defined by the second and the third weld head.

10. The method of claim 9, wherein the second and the third weld heads are directly connected to each other.

11. The method of claim 8, including a plurality of weld heads, wherein each of the weld heads is independently controllable relative to the others.

12. The method of claim 8, wherein the predetermined variation includes a predetermined variation in a rotational direction of the oscillation relative to a plane of the tabs.

13. The method of claim 8, wherein the mechanical oscillation is a sine wave.

14. The method of claim 8, wherein the predetermined variation includes at least one of: a predetermined phase shift, a predetermined amplitude change, a predetermined amplitude attenuation, and a predetermined frequency change in the mechanical oscillation.

15. A system for forming a vibration-welded joint between adjacent surfaces of at least one work piece in a welded assembly, the apparatus comprising:
    at least one sonotrode having at least one weld head directly connected thereto, wherein the sonotrode and weld head are configured to oscillate in response to a mechanical oscillation, the mechanical oscillation having a predetermined variation in at least one of a direction, an amplitude, a frequency, and a wavelength; and
    a weld controller adapted for generating a set of control signals to produce the mechanical oscillation having the predetermined variation;
    wherein the predetermined variation is transmitted to the at least one weld head during formation of the vibration-welded joint, thus minimizing an amount of mechanical resonance occurring in the welded assembly by an oscillation of the sonotrode and weld head.

16. The system of claim 15, wherein the mechanical oscillation is a periodic wave, and wherein the predetermined variation includes at least one of: a predetermined phase shift in the periodic wave, a predetermined interruption in the periodic wave, and a predetermined attenuation in the periodic wave.

17. The system of claim 15, wherein the at least one weld head includes an even number of substantially identical weld heads, including a first weld head positioned adjacently to a second weld head, and wherein the controller synchronizes an oscillation of the first and second weld heads to substantially balance a force and a moment imparted to the component during formation of the vibration-welded joint.

18. The system of claim 15, wherein the work pieces include conductive tabs of a multi-cell vehicular battery unit.

19. The system of claim 15, wherein the predetermined variation is a variation in a circular direction of a direction of rotation of the mechanical oscillation relative to a plane of the component.

20. The system of claim 15, wherein the at least one weld head includes a first, a second, and a third weld head, with the first weld head being nested within a channel defined by a second and a third weld head.

* * * * *